United States Patent
Schmidt et al.

(10) Patent No.: US 9,671,602 B2
(45) Date of Patent: *Jun. 6, 2017

(54) MEASUREMENT METHOD FOR HEIGHT PROFILES OF SURFACES USING A DIFFERENTIAL INTERFERENCE CONTRAST IMAGE

(75) Inventors: Christine Schmidt, Berlin (DE); Bernd Srocka, Berlin (DE); Ralf Langhans, Dresden (DE)

(73) Assignee: HSEB Dresden GmbH, Dresden (DE)

( * ) Notice: Subject to any disclaimer, the term of this patent is extended or adjusted under 35 U.S.C. 154(b) by 487 days.

This patent is subject to a terminal disclaimer.

(21) Appl. No.: 14/239,105

(22) PCT Filed: Aug. 9, 2012

(86) PCT No.: PCT/EP2012/065595
§ 371 (c)(1),
(2), (4) Date: Oct. 31, 2014

(87) PCT Pub. No.: WO2013/023988
PCT Pub. Date: Feb. 21, 2013

(65) Prior Publication Data
US 2015/0049348 A1    Feb. 19, 2015

(30) Foreign Application Priority Data

Aug. 16, 2011   (DE) .................. 10 2011 052 721

(51) Int. Cl.
*G02B 21/00*   (2006.01)
*G02B 21/14*   (2006.01)
(Continued)

(52) U.S. Cl.
CPC ............. *G02B 21/14* (2013.01); *G01B 9/04* (2013.01); *G01B 11/0608* (2013.01)

(58) Field of Classification Search
CPC ....... G02B 21/14; G01B 9/04; G01B 11/0608
See application file for complete search history.

(56) References Cited

U.S. PATENT DOCUMENTS 4,852,985 A  *  8/1989  Fujihara ................. G02B 21/08
                                                                 359/387
2002/0089741 A1    7/2002  Kuhn
(Continued)

FOREIGN PATENT DOCUMENTS

DE  10 2011 050 674 A1  11/2012
EP      2 214 045 A1     8/2010
(Continued)

OTHER PUBLICATIONS

F. Amiot, J.P. Roger: "Nomarski imaging interferometry to measure the displacement of micro-electro-mechanical systems" in Appl. Opt., vol. 45, No. 30, 2006, S.7800-7810; 11 pgs.
(Continued)

*Primary Examiner* — Hwa Lee
(74) *Attorney, Agent, or Firm* — Thorpe North & Western LLP

(57) ABSTRACT

A method for optically measuring height profiles of surfaces, in which an image of the height profile is recorded using an optical recording system, is characterized in that the image is a differential interference contrast image and height gradients within the height profile are represented by intensity gradients, which are quantitatively or qualitatively evaluatable. The surfaces can have structures having a defined profile, in which intensity gradients in the differential interference contrast image, which assume, within a specified tolerance and within a specified range, a value which deviates from a predetermined value or assume a selected value from within a specified tolerance and within a specified range, indicate a defect.

12 Claims, 3 Drawing Sheets

(51) Int. Cl.
*G01B 9/04* (2006.01)
*G01B 11/06* (2006.01)

(56) References Cited

U.S. PATENT DOCUMENTS

| | | |
|---|---|---|
| 2005/0254065 A1 | 11/2005 | Stokowski |
| 2007/0268545 A1 | 11/2007 | Gluckstad |
| 2010/0195873 A1 | 8/2010 | Cui et al. |
| 2011/0181891 A1 | 7/2011 | Hwang et al. |

FOREIGN PATENT DOCUMENTS

| | | |
|---|---|---|
| JP | H11 133308 A | 5/1999 |
| WO | WO 03 029872 A1 | 4/2003 |

OTHER PUBLICATIONS

T.J. McIntyre et al.: "Differential interference contrast imaging using a spatial light modulator" in Optics Letters, vol. 34, No. 19, 2009, S.2988-2990; 3 pgs.

T.J. McIntyre et al.: "Quantitative SLM-based differential interference contrast imaging" in Opt. Express 18, 14063-14078 (2010); 16 pgs.

R.Danz, et al. „PlasDIC—a useful modification of the differential interference contrast in Photonic, vol. 36, 1 (2004), S.42-45; 20 pgs.

Fundamental Concepts in DIC Microscopy (http://www.olympusmicro.com/primer/techniques/dic/dicintro.html); 12 pgs.

Wavefront Shear in Wollaston and Nomarski Prisms (http://www.olympusmicro.com/primer/java/dic/wollastonwavefronts/index.html); accessed Jul. 12, 2010; 5 pgs.

\* cited by examiner

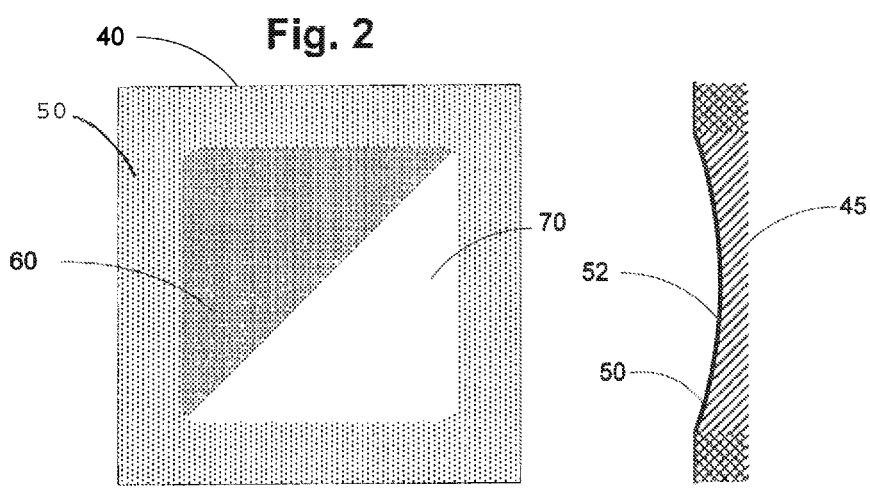
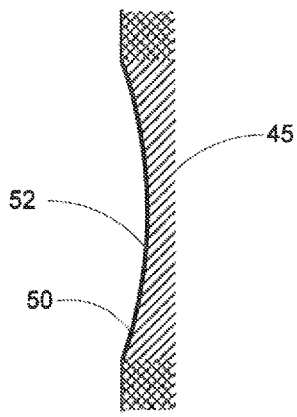
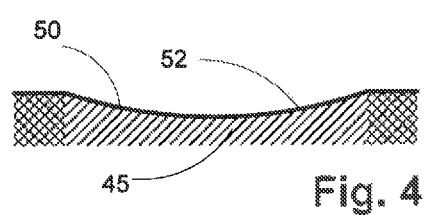

MEASUREMENT METHOD FOR HEIGHT PROFILES OF SURFACES USING A DIFFERENTIAL INTERFERENCE CONTRAST IMAGE

TECHNICAL FIELD

The invention relates to an assembly for optically measuring height profiles of surfaces, comprising (a) a radiation source for illuminating the surface with light from the radiation source; and (b) an optical detection system for taking an image of the height profile with a camera and an objective for imaging the object plane to an image plane, wherein the objective has an exit pupil and an entrance pupil.

It is often necessary with the production of Micro Electro Mechanical Systems (MEMS) components to determine surface profiles. Often it is sufficient to qualitatively determine the profile. In different applications a quantitative measurement is necessary. Examples of such applications are the testing of pressure sensors, micro lenses and/or micro lens arrays, the testing of acceleration-, angular rate- and/or position sensors or micro mirror device in DMDs (DMD=Digital Micromirror Device).

PRIOR ART

Various methods are known for optical profile measuring which are commercially used. The methods are based mainly on the white light interferometry, confocal imaging, triangulation or wave front analysis.

All such methods have in common, that they are relatively slow or require very expensive additional components in addition to the imaging unit. The limitation of the velocity results from the fact that either measurements are made only point by point or in a line or that only one height slice can be detected for each image. Additional components are, depending on the application, interferometers, confocal imaging systems, precise height tables or objective height adjustment devices as well as special sensors, such as, for example, Hartmann-Schack sensors for the wavefront analysis.

DISCLOSURE OF THE INVENTION

It is an object of the invention to provide an assembly of the above mentioned kind which is simple, has a high sampling rate and enables an easy and reliable determination of the profile features.

According to an aspect of the invention this object is achieved by an assembly with the features of claim 1. Thereby, the image is a differential interference contrast image and height gradients within the height profile are represented by intensity gradients which can be quantitatively or qualitatively evaluated.

Differential interference contrast images (DIC) have the property that they provide an image of the height variation for an object by an intensity difference. If such images are taken from the surface of a uniform, non-bifringent material the profiling of the surface is visible as an intensity image. The imaging is effected by using a suitable optical element for the generation of a DIC-image. The wavelength range of the light used for the imaging is selected in such a way that the surface material is reflecting and interferences of light portions entering the material will not cause any disturbance. The generation of the DIC-image is known from DE 1 2011 050 678.8 of the applicant and is described below.

Known DIC assemblies are used for visualizing small creatures and organic surface structures in biology or for visualizing crystal properties in mineralogy. It was found out that DIC assemblies and methods are also suitable for the measurement of surface structures. The intensity distribution in the image is precisely evaluated with such methods.

An advantageous use of the assembly according to the present invention is characterized in that the surfaces are provided with structures having a well defined profile, where intensity gradients in the differential interference contrast image within a given tolerance and within a given range deviating from a set value or assume a selected value, in particular zero, within a given tolerance and within a given range, indicate a defect.

The intensity gradients represent the surface gradients of the surface to be tested. If the intensity gradients are outside a tolerance range about a selected value the surface has a defect. There are also applications where a defect can always be assumed with high reliability if there is no intensity gradient, i.e. if the surface is not curved in a given range.

An example of such applications is the examination of diaphragms of pressure sensors on Micro-Electro-Mechanical systems (MEMS)-basis, where the intensity gradients in the differential interference contrast image which are zero within a given tolerance and within a given range indicate a defect diaphragm. A diaphragm which is intact usually has a curved profile.

A further example of the present invention is the examination of surfaces comprising microsensors and/or micro lens arrays with concave and/or convex curved lens surfaces where the intensity gradients in the differential interference contrast image which are zero within a given tolerance and within a given range, indicate a missing lens.

Also, the surfaces can comprise acceleration-, angular rate- and/or position sensors in MEMS-form where sample mass is provided at springs having a movement causing an inclination of the sample surface which is adapted to be represented in a differential interference contrast image and to be compared with references. The sensors are based on the effect that a suitable sample mass is suspended at microscopic springs which are moved under the influence of gravity, the rotation and/or position. The movement causes an inclination of the visual surface. Malfunction can be recognized by an insufficient or overoscillating inclination.

The assembly according to the present invention can be used for surfaces comprising micro mirror arrays of a digital micro mirror device (DMD), having controllable mirrors fixed to spring elements, where the direction can be represented in a differential interference contrast image and compared with references.

The assembly according to the present invention for optically measuring height profiles of surfaces comprises (a) a radiation source for illuminating the surface with light from the radiation source; and (b) an optical detection system for taking an image of the height profile with a camera and an objective for imaging the object plane to an image plane, wherein the objective has an exit pupil and an entrance pupil.

The assembly according to the present invention further comprises (c) a Köhler illuminating optical assembly for illuminating the object plane with light from the radiation source; wherein the entrance pupil of the objective is positioned in the illuminating pupil of the Köhler illuminating optical assembly; and (d) one or more components for the generation of a differential interference contrast image where the height gradients within the height profile are represented by intensity gradients which can be quantitatively or qualitatively evaluated.

The components for the generation of the differential interference contrast image do not comprise expensive Nomarski-prisms, polarizers, analysers or other filters.

An important component of the assembly according to the present invention are means for evaluating the intensity values comprised in the DIC image. Contrary to known assemblies the DIC image is not only generated and viewed but,—preferably by use of devices and automatically—evaluated. In such a way, an automatic evaluation of the intensity values enables automatic influencing and corrections of examined processes and assemblies.

According to the invention the components for the generation of a differential interference contrast image are formed by an amplitude filter in the exit pupil of the objective instead of Nomarski-prisms, the amplitude filter having an amplitude transmission factor $F_{DIC}(x,y)$, which complies with the equation:

$$2 \cdot F_{DIC}(x, y) = F_+(x, y) \cdot e^{+iP_0} + F_-(x, y)$$

$$= 2 \cdot T_0 \cdot \cos\left(P_{max}(-x \cdot \sin\varphi + y \cdot \cos\varphi) + \frac{P_0}{2}\right) \cdot e^{+i\frac{P_0}{2}}$$

wherein
x,y: coordinates in the exit pupil plane
$F_{DIC}(x,y)$: functional expression for describing the amplitude filter transmission and the phase of the amplitude filter as a function of x and y
t(x,y): variable, real portion of the amplitude transmission factor of the amplitude filter with $$t(x, y) = T_0 \cdot \cos\left(P_{max}(-x \cdot \sin\varphi + y \cdot \cos\varphi) + \frac{P_0}{2}\right)$$

T(x,y): Transmission degree of the amplitude filter. If $F^*_{DIC}(x,y)$ designates the conjugate-complex of $F_{DIC}(x,y)$, then $T(x,y)=F_{DIC}(x,y) \cdot F_{DIC}^*(x,y)=t^2(x,y)$
$F_+(x,y)$: "positive" portion of $F_{DIC}$, with $F_+(x,y)=T_0 \cdot e^{+iP_{max} \cdot (-x \cdot \sin\varphi + y \cdot \cos\varphi)}$
$\varphi$: azimuth direction angle of the effect of the DIC in the exit pupil plane
P(x,y): phase distribution of the amplitude filter with $$P(x, y) = \arg(F_{DIC}) \begin{cases} \frac{P_0}{2} & -\pi \leq 2P_{max} \cdot (-x \cdot \sin\varphi + y \cdot \cos\varphi) + P_0 \leq \pi \\ \frac{P_0}{2} + \pi & \pi \leq 2P_{max} \cdot (-x \cdot \sin\varphi + y \cdot \cos\varphi) + P_0 \leq 3\pi \end{cases}$$

$F_-(x,y)$: "negative" portion of $F_{DIC}$, with $F_+(x,y) \cdot F_-(x,y) = T_0 \cdot e^{+iP_{max} \cdot (-x \cdot \sin\varphi + y \cdot \cos\varphi)} \cdot T_0 \cdot e^{-iP_{max} \cdot (-x \cdot \sin\varphi + y \cdot \cos\varphi)} = T_0^2$
$P_0$: constant, real phase offset of the amplitude filter $F_{DIC}(x,y)$
$T_0$: constant, real amplitude transmission factor of $F_{DIC}$, or $F_+$ and $F_-$, resp.
$P_{max}$: constant, real maximum phase of $F_+$ or $F_-$, resp A particularly good quantitative evaluation of the intensity for the determination of the height profile is enabled with such an assembly. Contrary to common DIC-methods it does not require a low-strain optical assembly, has a higher light throughput and adjustment is easier. This applies in particular if the object is reflecting and the surface of homogenous material. In the DIC method the height gradient of the examined surface is transferred directly to an intensity image. The transformation results from the precisely inserted amplitude filter.

The phase distribution P(x,y) in the exit pupil is a phase step with maximum two relevant values.

In such a modification of the invention optical imaging chains can be modified where the aperture or the pupil between the object and the image is physically accessible. The modification is effected by an additional component in the exit pupil of the objective. Thereby, otherwise invisible features of the object are enhanced in the image of the object and can be detected by the detector.

According to this modification of the invention the additional component is an optical amplitude filter generating the same optic effects as the known differential interference contrast (DIC) microscopy. However, DIC specific components, such as Nomarski prisms or polarizers can be entirely omitted. It is not necessary to use polarized light. The present invention is, therefore, not a polarization contrast method. The assembly is insensitive to polarization. The imaging optical assembly must, therefore, only comply with easy requirements than known DIC microscopes. With transmitted light the assembly is essentially independent of the magnification and with certain embodiments entirely independent of the magnification. It is a special advantage of the invention that the assembly is easily upgraded with an amplitude filter and easily adjusted.

$F_{DIC}(x,y)$ is a functional expression for describing the amplitude filter transmission and the phase of the amplitude filter depending on the coordinates x and y. The distribution of the transmission degree of the amplitude filter in the x- and y-direction is described by the complex value $F_{DIC}(x,y)F^*_{DIC}(x,y)$.

$\varphi$ is the azimuth direction angle of the effect of the DIC in the exit pupil plane. However, it can equally describe the azimuth direction angle in the image plane if the coordinate system described by x and y of the exit pupil is transferred to the image plane.

P(x,y) represents the phase distribution of the amplitude filter, i.e. the distribution of the effect on the phase of the incident radiation. The phase is described by the complex argument of the filter, $P(x,y)=\arg(F_{DIC})$. The practical realization of such a phase can be effected by differences $\Delta d$ of the thickness of the substrate of the amplitude filter. Such differences comply with the formula:

$$(n-1) \cdot \Delta d(x, y) = \frac{P(x, y)}{2\pi} \cdot \lambda$$

wherein $\lambda$ is the wavelength of the light from the radiation source and n is the diffraction index of the filter substrate at wavelength $\lambda$. In an alternative modification of the invention the phase distribution is effected with a suitable coating of the filter substrate.

$P_0$ is a phase offset of the amplitude filter. The phase offset can be chosen at will. It will not have an effect on the image generation. The phase offset enables the use of an amplitude filter with a filter substrate thickness which can be well handled.

$T_0$ represents the amplitude transmission factor of the amplitude filter. It is a constant factor which is independent of the coordinates x and y in the exit pupil. In other words: $T_0$ represents the basic transmission of the filter substrate.

The use of an amplitude filter with properties essentially complying with the above formula will include some special cases with some approximations:

The amplitude filter can be formed by a pure intensity filter which has the same thickness at every point, i.e. $\Delta d(x,y)=0$. A phase distribution and in particular a phase difference is not generated. The radiation from the radiation source must not be monochromatic. The transmission degree of such an intensity filter has a distribution according to the $F_{DIC}(x,y)F^*_{DIC}(x,y)$. The phase distribution $P(x,y)$ is set to zero for all points (x,y). Compared to an amplitude filter with phase difference the image is only very little more diffuse despite this approximation.

For the generation of a distribution of the amplitude transmission the amplitude filter can be coated with aluminum or another suitable, absorbing material. Thereby, the distribution of the intensity is suitably influenced. Alternatively, a plate is used which has a varying optical thickness depending on the coordinates x and y.

In a further approximation no phase difference is generated also, i.e. the phase distribution $P(x,y)$ is set to zero for all points (x,y). It is, furthermore, provided that the amplitude filter is a knife-edge in the exit pupil which does not let any intensity pass on one side and blocks the radiation in one part of the exit pupil and lets maximum intensity pass on the other side in the remaining part of the exit pupil, i.e the transmission degree $T(x,y)$ is set to zero in all points for $T(x,y) \leq S$ with S being a threshold with $0 \leq S \leq T_0^2$. Preferably, the knife-edge is arranged in such a way that at least half of the radiation is with maximum intensity passes.

In an alternative embodiment of the invention monochromatic radiation is used and a phase step. The phase can then be set to zero.

It is a common feature of all embodiments that no polarizer and no Nomarski-prism is necessary. Thereby, the light throughput of the optical assembly is much higher than compared to known methods. It is also not necessary to use coherent light or a small illumination aperture. The assembly can be used independently of the kind of light source and independently of the polarization of the light.

The effect of the amplitude filter in the exit pupil can be derived from the following considerations:

Theoretically a differential interference contrast (DIC) can be described as the result of two independent amplitude filters on the optical transmission function in the course of a partially coherent imaging in a microscope. The differential interference contrast is generated in the image space from two perpendicularly polarized and thereby independent bright field illuminators. The radiation is distinguished from each other by their systematic phase gradients in the entrance pupil of the microscope objective. Both phase gradients have the same absolute value, they are "quasi-linear" and have the same direction. The phase gradients, however, have opposite senses of direction, i.e. they have opposite signs. The direction of the phase gradients with classical DIC is set by the direction of the two wedges of the Nomarski-prism in the illumination path.

The first Nomarski-prism is optically in the range of the entrance pupil of the microscope objective but before the object in the imaging chain. Due to the Nomarski-prism two polarization dependent opposite phase gradients are caused along the direction of the wedge of the Nomarski-Prism.

The second Nomarski-Prism is physically arranged in the imaging radiation path in the range of the exit pupil of the microscope objective. Optically it is at the same position as the first Nomarski-prism but behind the object in the imaging chain. However, it is orientated in such a way that it compensates the two polarization dependent phase gradients of the first Nomarski-prism.

Considered from the standpoint of the partially coherent image in the microscope the Köhler illumination generates an almost entirely incoherent substitute light source in the entrance pupil of the microscope objective and such substitute light source is before the object in the imaging chain. The first Nomarski-prism which is also positioned before the object in the imaging chain and which lays in the entrance pupil has, therefore, no effect which is relevant for the image. It can be omitted. The second Nomarski-prism generates the opposite phase gradients in the exit pupil. Each individual amplitude distribution of each wave diffracted by the object belonging to an incoherent point of the substitute light source is impressed on one of the two opposite phase gradients. This is automatically effected depending on the polarization for each incoherent illumination portion. It is sufficient to place a polarizer directly before the second Nomarski-prism in the imaging chain. The polarizer in the illumination radiation path is relevant only for the operation of the first Nomarski-prism and can, therefore, be omitted.

An entirely transparent amplitude filter in the exit pupil of the microscope objective exclusively consisting of a quasi-linear phase gradient causes a lateral shift of the microscope image. The following applies:

$$\frac{P_{max}}{2\pi} \lambda = A \cdot \Delta z$$

wherein
$\Delta z$: lateral shift of the image calculated for the object plane in the object plane of the microscope in the direction of the phase gradient.
A: object aperture of the microscope
$P_{max}$: phase of the phase gradient having the largest absolute value at the edge of the exit pupil of the microscope The amplitude filter according to the present invention can be derived by means of two quasi-linear, opposite phase gradients $+P_{max}$ and $-P_{max}$ which depend on the polarization. With such an amplitude filter the second Nomarski-prism, its polarizer and its analyzator can be omitted in the imaging path of rays.

The dependency on the polarization of opposite phase gradients $\pm P_{max}$ of the fictive amplitude filter is irrelevant for the differential interference contrast effect itself. Preferably, the polarization properties of the object are also irrelevant with fictive amplitude filters. The fictive amplitude filters enable the combination with common polarization contrast methods.

The mathematical representation of the fictive polarization independent amplitude filters is effected by means of the fictive amplitude transmission factors $F_+$ and $F_-$, which represent the opposite phase gradients and for which applies in the above notation:

$$F_+(x,y) = T_0 \cdot e^{+iP_{max} \cdot (-x \cdot \sin \phi + y \cdot \cos \phi)}$$

The amplitude transmission factor $T_0$ is real and constant along the exit pupil and is typically between 0 and 1. $\phi$ is the orientation of the phase gradient in the exit pupil and has values between $-\pi$ and $+\pi$. $\phi=0$ means "meridional positive", i.e. +y in the coordinate system in the exit pupil. $\phi=-\pi/2$ means "sagittal positive", i.e. +x in the coordinate system in the exit pupil.

The fictive amplitude transmission factor $F_+$ can be realized in practice by, for example, a coated glass plate in the exit pupil. The glass plate is a phase plate having a transmission degree $F_+F^*_+$ and a change of thickness $\Delta d_+$ with a distribution which is in the above mentioned notation $$(n-1) \cdot \Delta d_+(x, y) = \frac{+P_{max}}{2\pi} \cdot \lambda \cdot (-x \cdot \sin\varphi + y \cdot \cos\varphi)$$
$$= +A \cdot \Delta z \cdot (-x \cdot \sin\varphi + y \cdot \cos\varphi)$$

If an opposite phase plate is added in the exit pupil to the phase plate described by the equation above, the overall effect of the amplitude filter is:

$$F_+(x,y) \cdot F_+(x,y) = T_0 \cdot e^{iP_{max}(-x \cdot \sin\phi + y \cdot \cos\phi)} \cdot T_0 \cdot e^{-iP_{max}(-x \cdot \sin\phi + y \cdot \cos\phi)} = T_0^2$$

In other words: a paired, opposite shift is not effected. There is no lateral shift at all, since the light is not allocated to the two halves of the phase plate.

The claimed amplitude filter which technically can be put into practice with the property $$2 \cdot F_{DIC}(x, y) = F_+(x, y) \cdot e^{+iP_0} + F_-(x, y)$$
$$= 2 \cdot T_0 \cdot \cos\left(P_{max}(-x \cdot \sin\varphi + y \cdot \cos\varphi) + \frac{P_0}{2}\right) \cdot e^{+i\frac{P_0}{2}}$$

separates the light into two portions and thereby generates the desired paired lateral shift which is necessary for the generation of a differential interference contrast. It is important, that the effect of the assembled amplitude filter $F_{DIC}(x,y)$ has an added up distribution of the amplitude transmission factor with an added-up distribution of the phase. The combined effect of the fictive amplitude filter pair $F_+$, $F_-$ can be distributed on an intensity filter which can be technically put into practice and a phase plate which can also be technically put into practice, by expressing the amplitude filter in the form of a complex product of a transmission degree $T(x,y)$ and a phase $P(x,y)$. $T(x,y)$ and $P(x,y)$ must have the same effect as $F_{DIC}(x,y)$ on the complex light amplitudes and this can be effected in an unambiguous way only if a possibly negative amplitude transmission factor $$F_{DIC}(x, z) = t(x, z) \cdot e^{i\frac{P_0}{2}} \text{ at } (x, y)$$

is replaced by a non-negative amplitude transmission factor $F_{DIC}(x,z) = \sqrt{T(x,z)} \cdot e^{iP(x,z)}$ and an additional phase $\pi$ with $P(x,y) = P_0/2 + \pi$ is added to the phase $P_0/2$; in such a way the amplitude transmission factor can be unambiguously expressed in the form of an optical density. The possibly modified phase $P(x,y)$ in return can be expressed by a variation of the thickness of the glass plate of the filter substrate.

Any distribution $I_T(x,y) = I_0 \cdot T(x,y)$ can be used for the distribution of the Transmission degree $I_T(x,y)$ of the amplitude filter $F_{DIC}(x,y)$, where $0 < I_0$ is a random scaling factor. The following equation applies to the phase plate representing the possibly modified phase $P(x,y)$:

$$e^{iP(x,y)} = \frac{F_{DIC}}{\sqrt{T(x, y)}}.$$

The described assembly differs from a Foucault knife-edge. The Foucault knife-edge is placed in the image plane or in an intermediate image plane of an objective. The DIC knife-edge is in the exit pupil or in a pupil of an objective. Ideally, a point object is used with a Foucault knife-edge. The extension of the object should at least be in the order of an airy disc ($1.22 \cdot \lambda/A$). The DIC knife-edge is only useful when applied to extended objects. It does not make sense for point-like objects. The Foucault knife-edge is used for intensity objects and is not useful for phase objects. The DIC knife-edge is particularly advantageous with pure phase objects.

The assembly according to the present invention can be used for the optical measuring of height profiles of surfaces where height gradients in the height profile are represented by intensity gradients in the differential interference contrast image which can be quantitatively or qualitatively evaluated. The assembly can be particularly advantageously used if the surfaces have structures with a well defined profile where intensity gradients in the differential interference contrast image within a given tolerance and within a given range deviating from a set value or assume a selected value, in particular zero, within a given tolerance and within a given range, indicate a defect.

Further modifications of the present invention are subject matter of the subclaims. Embodiments are described below in greater details with reference to the accompanying drawings.

BRIEF DESCRIPTION OF THE DRAWINGS

FIG. 2 is a schematic representation of a diaphragm of a working sensor in a DIC-image.

FIG. 3 is a cross-sectional view of the sensor of FIG. 2 along a cross sectional axis from top to bottom in FIG. 2.

FIG. 4 is a cross-sectional view of the sensor of FIG. 2 along a horizontal cross sectional axis in FIG. 2.

DESCRIPTION OF THE EMBODIMENTS

Figure 1:
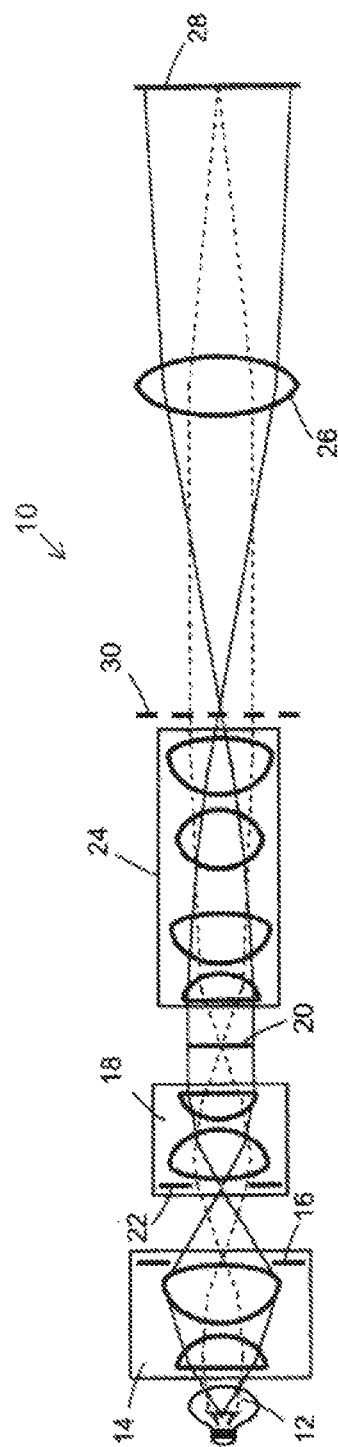
FIG. 1 is a schematic representation of the components of a transmission light microscope for the generation of a differential interference contrast image.

FIG. 1 shows a transmission microscope for the generation of a differential interference contrast image which is generally designated with numeral 10. The microscope 10 is provided with a lamp 12 as a radiation source. A collector 14 with a lens assembly and a luminous field stop 16 is arranged before the lamp 12 in the luminous field stop plane. The illumination assembly of the microscope 10 is furthermore provided with a condensor 18 with a lens assembly and an illumination aperture stop 22. The collector 14 and the condensor 18 are arranged in such a way that the object 20 in the object plane is illuminated with Köhler illumination. Thereby, the luminous field stop plane is imaged with the condensor 18 into the object plane. This can be recognized easily in the light path shown in FIG. 1. The object plane is evenly illuminated even with an unevenly emitting radiation source.

The object 20 positioned in the object plane is imaged to the image plane 28 in the usual way using an objective 24 with a suitable objective lens assembly and a tubus lens 26. As can be seen in FIG. 1 the optical assembly is designed in such a way that the illumination aperture plane 22 is imaged to the exit pupil plane 30 of the objective 24.

The above described assembly is well known in the art and corresponds to the usual microscope assemblies. Contrary to known microscopes, however, an amplitude filter in the form of a knife edge is positioned in the exit pupil plane. This means, that the filter transmits no light on one side of the edge and the entire intensity on the other side of the edge. The further out the edge is positioned the more light will fall on the detector in the imaging plane. The image quality, however, will decrease.

A phase and thereby a differential interference contrast image is generated with the knife edge. An example of such an image of a phase object is shown in FIGS. 2 to 7 by way of example.

It is also possible to use a reflecting light microscope instead of a transmitting light microscope. The amplitude filter is here also arranged in the exit pupil plane of the objective. The launching of the illumination from the side is effected by means of a semi-transparent mirror 40 in the light path between the objective and the lens tube.

FIGS. 2 to 7 illustrate how the described assembly is used for the examination of pressure sensors 40 on MEMS basis. The examined pressure sensors 40 are designed in such a way that a cavity 45 with a vacuum is airtight sealed by a diaphragm 50. Generally, the diaphragm 50 is a thin Si-diaphragm. The diaphragm 50 is, therefore, bent towards the inside. FIGS. 2 to 4 show the DIC-image taken with different intensities in various ranges 60 and 70 of the diaphragm 50 and the respective cross sections. The curvature 52 can be well seen in the cross sections.

Figure 5:
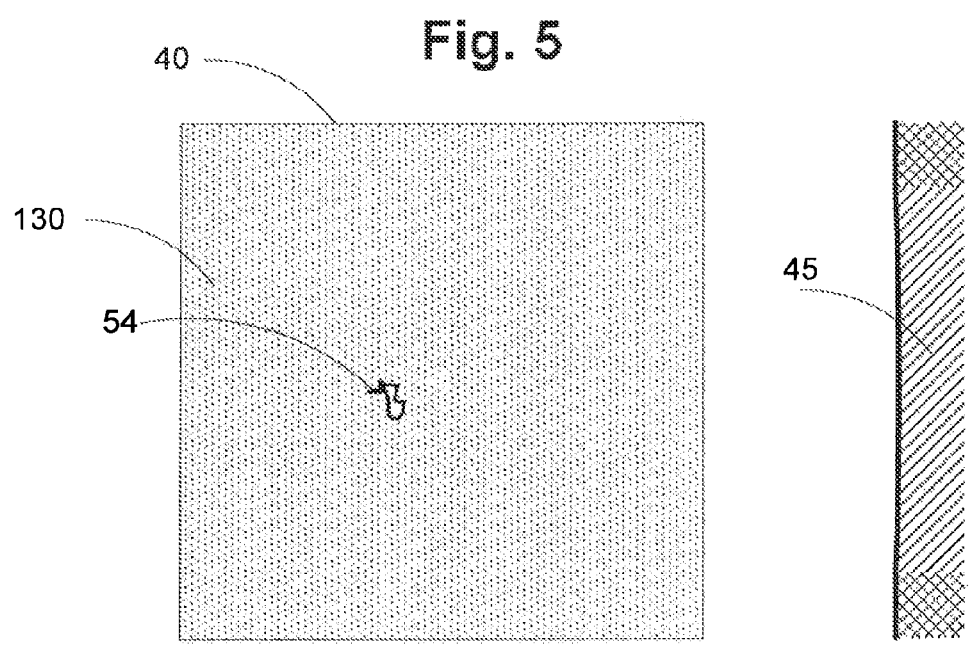
FIG. 5 is a schematic representation of a diaphragm of a defect sensor in a DIC image.
Figure 6:
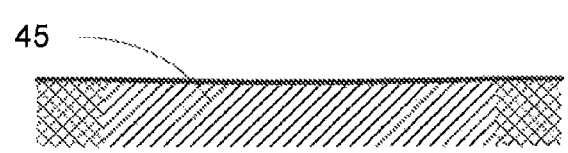
FIG. 6 is a cross-sectional view of the sensor of FIG. 5 along a cross sectional axis from top to bottom in FIG. 5.
Figure 7:
FIG. 7 is a cross-sectional view of the sensor of FIG. 5 along a horizontal cross sectional axis in FIG. 5.

Sensors with a defect insofar as the used material diaphragm 50 has holes or is torn can be well recognized with such a method. Intact pressure sensors can be easily distinguished from defect sensors because intact sensors are bent while defect sensor diaphragms are flat as shown in FIGS. 5 to 7. This results from the fact that a vacuum is present in the measuring volume and the intact sensor has an inwardly bent diaphragm. If the diaphragm has a defect, such as, for example, at the position 54, the pressure between the inside 45 (i.e. the pressure measuring volume) and the environment can equalize through the defect 54 and the diaphragm 40 and the curvature 52 of the diaphragm is released.

A defect diaphragm is shown in FIGS. 5 to 7. The diaphragm is flat. There are no phase differences for reflected light waves. The DIC image in FIG. 5, therefore, shows the entire diaphragm surface 130 with a uniform intensity. The intensity gradient over the entire range is zero within a tolerance.

If the DIC image is generated in the usual way a quantitative evaluation of the intensity for determining the height profile is possible only under certain conditions. This is due to the limitations of the method. It requires a low-tension optic, has little light throughput and requires difficult adjustment.

If the DIC image is generated with the above described assembly of FIG. 1 with a knife edge or another suitable amplitude filter a quantitative evaluation is well possible. This applies in particular if the object is reflecting and the surface is a homogenous material. The height gradient of the examined object is directly transferred to an intensity image with the DIC method. The transformation results from the inserted amplitude filter.

In another embodiment which is not shown here, micro lenses and micro lens arrays are investigated. Each lens has a concave or convex surface depending whether it is a collecting lens or a dispersing lens. Missing lens elements are, therefore, recognized by a missing surface curvature.

In a further embodiment, which is not shown here, acceleration-, angular rate- and/or position sensors are tested. All such Sensors in MEMS-form are based on the principle that a suitable sample mass is provided at microscopic springs which then are moved under the influence of gravity, rotation or location. In many cases the movement causes an inclination of the observed sample surface. Malfunction can be recognized, therefore, with an insufficient or over-oscillating inclination.

In a further embodiment, which is not shown here, micro mirror arrays (DMD—digital micro mirror device) are tested. Such a micro mirror array consists of a plurality of microscopic mirror elements which are fixed to spring elements. Each mirror can be controlled individually by two electrodes by means of electrostatic forces and thereby shifted from its idle position. If a mirror element is inclined a corresponding intensity distribution is generated in the DIC image over the imaged mirror surface. If the entire array is observed in such a way all mirror elements must show the same intensity pattern if controlled in the same way. Defect mirrors or mirror controllers are, therefore, easily and quickly recognized.

What is claimed is:

1. An assembly for optically measuring a height profile with height gradients of a surface provided in an object plane, comprising
   a light emitting radiation source for illuminating said surface with light from said radiation source; and
      an optical detection system for taking an image of said height profile of said surface,
      said detection system comprising a camera and an objective for imaging said object plane to an image plane,
      wherein said objective has an exit pupil and an entrance pupil;
      and wherein
   a Köhler illuminating optical assembly is provided for illuminating said object plane with said light from said radiation source;
   wherein said entrance pupil of said objective is positioned in said illuminating pupil of said Köhler illuminating optical assembly; and
   wherein one or more components for the generation of a differential interference contrast image is provided where said height gradients within said height profile are represented by intensity gradients adapted to be quantitatively or qualitatively evaluated,
   wherein said components for the generation of a differential interference contrast image are formed by an amplitude filter in said exit pupil of said objective; and
   wherein said amplitude filter has an amplitude transmission factor $F_{DIC}(x,y)$, which complies with the equation:

$$2 \cdot F_{DIC}(x, y) = F_+(x, y) \cdot e^{+iP_0} + F_-(x, y)$$

$$= 2 \cdot T_0 \cdot \cos\left(P_{max}(-x \cdot \sin\varphi + y \cdot \cos\varphi) + \frac{P_0}{2}\right) \cdot e^{+i\frac{P_0}{2}}$$

wherein
   x,y: coordinates in said exit pupil plane $F_{DIC}(x,y)$: functional expression for describing the amplitude filter transmission and the phase of the amplitude filter as a function of x and y $t(x,y)$: variable, real portion of the amplitude transmission factor of the amplitude filter with $$t(x, y) = T_0 \cdot \cos\left(P_{max}(-x \cdot \sin\varphi + y \cdot \cos\varphi) + \frac{P_0}{2}\right)$$

$T(x,y)$: Transmission degree of the amplitude filter (if $F^*_{DIC}(x,y)$ designates the conjugate-complex of $F_{DIC}(x,y)$, then $T(x,y)=F_{DIC}(x,y) \cdot F_{DIC}^*(x,y)=t^2(x,y)$)

$F_+(x,y)$: "positive" portion of $F_{DIC}$, with $F_+(x,y)=T_0 \cdot e^{+iP_{max}(-x \cdot \sin\phi + y \cdot \cos\phi)}$ $\phi$: azimuth direction angle of the effect of the DIC in the exit pupil plane $P(x,y)$: phase distribution of the amplitude filter with $$P(x, y) = \arg(F_{DIC}) \begin{cases} \frac{P_0}{2} & -\pi \le 2P_{max} \cdot (-x \cdot \sin\varphi + y \cdot \cos\varphi) + P_0 \le \pi \\ \frac{P_0}{2} + \pi & \pi \le 2P_{max} \cdot (-x \cdot \sin\varphi + y \cdot \cos\varphi) + P_0 \le 3\pi \end{cases}$$

$F_-(x,y)$: "negative" portion of $F_{DIC}$, with $F_+(x,y) \cdot F_-(x,y) = T_0 \cdot e^{+iP_{max}(-x \cdot \sin\phi + y \cdot \cos\phi)} \cdot T_0 \cdot e^{-iP_{max}(-x \cdot \sin\phi + y \cdot \cos\phi)} = T_0^2$ $P_0$: constant, real phase offset of the amplitude filter $F_{DIC}(x,y)$ $T_0$: constant, real amplitude transmission factor of $F_{DIC}$, or $F_+$ and $F_-$, respectively, $T_0 \ne 0$ $P_{max}$: constant, real maximum phase of $F_+$ or $F_-$, respectively.

2. The assembly of claim 1, and wherein said amplitude filter is an intensity filter with a substrate having a substrate thickness which is the same in every point.

3. The assembly of claim 1, and wherein said amplitude filter for the generation of an amplitude transmission distribution is coated with aluminum or any other suitable absorbing material.

4. The assembly of claim 1, and wherein said amplitude filter is provided with a knife-edge extending in said exit pupil, which does not let any intensity pass on one side and blocks said radiation in a portion of said exit pupil and which lets the maximum intensity pass on the other side in the remaining portion of the exit pupil.

5. The assembly of claim 4, and wherein said knife-edge is positioned in such a way that at least half of said radiation passes with maximum intensity.

6. The assembly of claim 1, and wherein a zero diffraction order of light diffracted by said object plane passes with maximum intensity.

7. A method for optically measuring a height profile of a surface with an assembly according to claim 1, comprising:
illuminating the surface to be measured with said light from said radiation source;
taking an image of said height profile with said optical detection system, wherein said image is a differential interference contrast image and height gradients within said height profile are represented by intensity gradients;
quantitatively or qualitatively evaluating said differential interference contrast image to obtain a measure of the height profile of the surface.

8. The method of claim 7, wherein said surfaces is provided with structures having a well defined profile, and wherein the step of quantitatively or qualitatively evaluating said differential interference contrast image includes the step of determining whether the intensity gradients in said differential interference contrast image within a given tolerance and within a given range deviate from a set value or assume a selected value, in particular zero, within a given tolerance and within a given range, thereby indicating a defect in said surface.

9. The method of claim 7, wherein said surface comprise diaphragms of pressure sensors on Micro-Electro-Mechanical systems (MEMS)-basis, and wherein the step of quantitatively or qualitatively evaluating said differential interference contrast image includes the step of determining the intensity gradients in said differential interference contrast image where said intensity gradients in said differential interference contrast image which are zero within a given tolerance and within a given range indicate a defective diaphragm.

10. The method of claim 7, wherein said surface comprises microsenses and/or micro lens arrays with concave and/or convex curved lens surfaces, and wherein the step of quantitatively or qualitatively evaluating said differential interference contrast image includes the step of determining the intensity gradients in said differential interference contrast image where said intensity gradients in said differential interference contrast image which are zero within a given tolerance and within a given range, indicate a missing lens.

11. The method of claim 7, wherein said surface comprises acceleration-, angular rate- and/or position sensors in MEMS-form where sample masses are provided at springs having a movement causing an inclination of said sensors which is adapted to be represented in a differential interference contrast image and to be compared with references, and wherein the step of quantitatively or qualitatively evaluating said differential interference contrast image includes the step of determining the intensity gradients in said differential interference contrast image and comparing said determined intensity gradients with said references.

12. The method of claim 7, wherein said surface comprises micro mirror arrays of a digital micro mirror device (DMD), having controllable mirrors fixed to spring elements, were the direction can be represented in a differential interference contrast image and compared with references, and wherein the step of quantitatively or qualitatively evaluating said differential interference contrast image includes the step of determining the intensity gradients in said differential contrast image and comparing said determined intensity gradients with said reference.

* * * * *